United States Patent [19]

Gelin

[11] Patent Number: 5,163,071
[45] Date of Patent: Nov. 10, 1992

[54] METHOD AND ARRANGEMENT FOR BIT SYNCHRONIZATION IN A RECEIVER FOR DIGITAL DATA TRANSMISSION

[75] Inventor: Benoit Gelin, Bonneuil, France

[73] Assignee: U. S. Philips Corporation, New York, N.Y.

[21] Appl. No.: 483,495

[22] Filed: Feb. 20, 1990

[30] Foreign Application Priority Data

Feb. 21, 1989 [FR] France ............... 89 02234

[51] Int. Cl.$^5$ .............................. H04L 7/33
[52] U.S. Cl. .................... 375/114; 364/463
[58] Field of Search ............... 375/102, 114, 106, 119; 370/105.1, 91, 92, 94.1; 340/825.62, 825.68; 364/463

[56] References Cited

U.S. PATENT DOCUMENTS 4,847,877  7/1989  Besseyre .................. 375/114

Primary Examiner—Curtis Kuntz
Assistant Examiner—Tesfaldet Bocure
Attorney, Agent, or Firm—David R. Treacy

[57] ABSTRACT

Method and apparatus for bit synchronization in a receiver for digital data transmission in which the received short-length packets of bit pulses are first converted into normalized 1 or 0 samples at the rate nFb, where Fb is the bit rate and n a small even integer. For each packet or sub-packet of M bits, the following steps are performed:

a) storing the normalized samples according to a sequence matrix [B] having (n+1) row-sequences B1, . . . , BA+1 and M columns;

b) determining and storing a transition column matrix [T] having n rows obtained by adding modulo-2 pairs of adjacent sequences B1, . . . , Bn+1;

c) calculating two barycentre numbers m1 and m2 for the upper and lower half of the matrix [T];

d) calculating a barycentre number m of matrix [T] derived from numbers m1 and m2 and matrix [T] or matrix [T] robated cyclically by half the number of rows (n/2), depending on whether m2−m1 is smaller than n/2 or not.

e, f) calculating an integer j=(m'−n/2) modulo-n, where m' is the nearest integer to number m;

g) choosing the sequence Bj as the optimum sequence representative of the M-bit (sub)-packet in question.

13 Claims, 3 Drawing Sheets

METHOD AND ARRANGEMENT FOR BIT SYNCHRONIZATION IN A RECEIVER FOR DIGITAL DATA TRANSMISSION

BACKGROUND OF THE INVENTION

The invention relates to a bit synchronization method, in a receiver, for packets of binary pulses, having a predetermined short length carrying digital information with detectable transitions between binary states, and being received in an asynchronous manner relative to the bit clock, at a rate Fb; and in particular to such a method which includes a first step of sampling said pulse trains at the rate nFb, where n is a small even integer, a second step which consists of normalizing the samples x thus obtained, or samples f derived from the latter, into binary values 1 or 0, by comparing each sample to a predetermined threshold S.

The invention relates to any type of receiver which receives digital information from wire telephone lines or optical fibres or from a radio link. The modulation used for the coding of the bits may be a phase modulation (PSK) of the RZ or nRZ type for example, or of the FSK type with or without maintaining a continuous phase for the input signal of the receiver. Preferably, the bit synchronization method according to the invention relates to a homodyne or heterodyne radio receiver receiving, during digital transmission by means of frequency shift keying (FSK), packets (or frames) of binary pulses having a fixed predetermined short length at a bit rate Fb.

An arrangement for implementing the above method may be formed by means of software or hardware. In the first case the receiver comprises, in addition to an analog-to-digital converter, a control microprocessor and a calculation microprocessor. The hardware embodiment itself comprises an FSK signal demodulator, sampling means for sampling at the rate n.Fb and sample normalizing means.

The technical problem which is solved by the invention consists of obtaining, in the fastest way possible, by means of a digital technique, the optimal bit synchronization for short bit packets (each packet belonging to a frequency hop interval of the received signal), typically shorter than 100 bits, without the need for a preliminary sequence termed "training bit sequence" at the beginning of the packet, obtaining the optimal information (at the midpoint of the bits) for all the received bits of each packet.

DESCRIPTION OF THE PRIOR ART

Analog bit synchronization methods by means of phase locked loops are known. These methods cannot be used for the considered applications because the length of the packets would be too short to have time to synchronise.

Among the digital methods of clock-recovery (or bit synchronization) 4 main categories are distinguished:

Optimal estimation of the bit clock phase; the structures used are direct transpositions of the results of the estimation theory. These methods require too long computing intervals.

Estimation by means of rectifying: these methods use non-linear processes presenting a great sensitivity to noise.

Estimation by means of zero-crossing detection: this method is only suitable for input signal modulation techniques that impose a continuous phase on the signal, which is not always the case.

Estimation by means of correlation: this method is currently used to realize the frame sync (beginning of the packet) but it is not precise enough to obtain the bit sync. In addition, it necessitates a preliminary sequence which diminishes the useful information rate.

More specifically, from U.S. Pat. No. 4,189,622 a bit synchronization arrangement is known for a radio receiver receiving an FSK signal, by means of which the signal is sampled at the rate n.Fb and then normalized into 1 and 0. The adjacent normalized samples are compared to detect the transitions appearing (1) or not appearing (0) int he signal and the transistions are stored in counters each selecting the transitions of a given rank from the n ranks of the bit period. After a predetermined number of bit periods, the counter containing the most transitions is selected and the bit clock may be readjusted by the incrementation of 1 rank according to the rank of the selected counter. When only considering the counter containing the most transitions, one has an exposure to a great sensitivity to noise and the necessity of a downstream complex digital filtering, comprising a plurality of circuits, will render this system costly and not fast enough to recover the optimal information for all received bits.

SUMMARY OF THE INVENTION

The objects of the present invention are to obtain a fast optimal recovery of the bit clock, which is not very sensitive to noise and uses short data packets without the need for a continuous phase for the received coded signal and without these packets comprising a preliminary training bit sequence.

These objects are achieved and the disadvantages of the prior art mitigated or suppressed owing to the fact that the method indicated in the first paragraph is characterized in that it further includes the following steps:

a) storing, over M successive bits belonging to each bit train of normalized sample bits, M.(n+1) normalized samples according to a sequence matrix [B] with (n+1) rows and M columns:

$$[B] = \begin{bmatrix} B1 \\ B2 \\ \vdots \\ Bn+1 \end{bmatrix} = \begin{bmatrix} f1 & fn+1 & f2n+1 & \ldots & f(M-1)n+1 \\ f2 & fn+2 & f2n+2 & \ldots & f(M-1)n+2 \\ \vdots & \vdots & \vdots & & \vdots \\ fn+1 & f2n+1 & f3n+1 & \ldots & f(M\cdot n)+1 \end{bmatrix}$$

b) determining and storing a transition column matrix [T] having n rows:

$$[T] = \begin{bmatrix} t1 \\ t2 \\ \vdots \\ tn \end{bmatrix} = \begin{bmatrix} (f1 \oplus f2) + (fn+1 \oplus fn+2) + \ldots + (f(M-1)n+1 \oplus f(M-1)n+2 \\ (f2 \oplus f3) + (fn+2 \oplus fn+3) + \ldots + (f(M-1)n+2 \oplus f(M-1)n+3 \\ \vdots \\ (fn \oplus fn+1) + (f2n \oplus f2n+1) + \ldots + (fMn \oplus fMn+1) \end{bmatrix}$$

where ⊕ designates the Exclusive —OR operator, c) calculating two barycentre numbers m1, m2, derived from the matrix [T]:

m1 = P1/Q1 m2 = P2/Q2 where $$P1 = \sum_{i=1}^{n/2} i \cdot ti \quad Q1 = \sum_{i=1}^{n/2} ti$$

$$P2 = \sum_{i=n/2+1}^{n} i \cdot ti \quad Q2 = \sum_{i=n/2+1}^{n} ti$$

and i varies from 1 to n, d) calculating a number m derived from the numbers m1, m2 and from the matrix [T]:

$m = (m1 \cdot Q1 + m2 \cdot Q2)/(Q1 + Q2)$    if: $m2 - m1 < n/2$ $m = ((m1+n) \cdot Q1 + m2 \cdot Q2)/(Q1 + Q2)$    if: $m2 - m1 \geq n/2$ e) calculating an integer m derived from the number m:

$m' = E(m + 0.5)$ where E is an operator meaning to take the integer part of the operand, f) calculating an integer j comprised between 1 and n, derived from the numbers m" and n:

$j = (m' - n/2) \text{modulo-} n$ g) choosing the sequence Bj as an optimal sequence of said M bits of each packet or sub-packet, respectively, of received bit pulses.

It should be observed that there is a temporary uncertainty as to which of the sequences B1, B2, ..., Bn is the optimal sequence; that is, the one nearest to the midpoint of the bits. This uncertainty becomes manifest at the level of the transition matrix [T] by a rotation uncertainty on the rows which are each reduced to one element t1, ..., tn. Two main cases may occur: either a great majority of transitions relate to a single ascending or descending bit edge, respectively, in which case the elements comprising the most transitions appear in the middle of the matrix [T], or the transitions are distributed over two bit edges, ascending and descending, in which case the elements comprising the most transitions appear separately at the two ends of the matrix [T]. The first case is the one corresponding to m2−m1<n/2, for which a simple calculation of the barycentre (centre of gravity) is performed and for which the calculated number m is near to n/2. For the second case is obtained: m2−m1≧n/2 and the calculation of the barycentre is performed by means of a matrix derived from the matrix [T] after rotation of the rows by half a cycle, which results in regrouping the transitions substantially around rank n by making the pulses related to an ascending pulse edge coincide with those related to a descending edge. The calculated number m is thus, as is suitable, near to n.

The number n, preferably below 10, is chosen to be equal to, for example, 4, 6 or 8.

For values of M higher than 16 one preferably chooses, for the implementation of the aforementioned method, a software solution according to which a calculation microprocessor is programmed for performing the sample normalizing into binary values 1 or 0, in order to perform the aforementioned steps a) to g) and produce at an output the optimal packet sequence of M bits at the rate Fb.

According to another software solution for implementing the invention, for long packets of the order of several dozen bits, each packet is cut into L slices (sub-packets) having a reduced fixed length (M=4, for example) and the algorithm defined by the steps of the method indicated above is completed in order to operate iteratively from one bit slice to the next. The latter software embodiment is characterized in that the sequence $Bj_k$ related to the sub-packet of rank k, where k varies chronologically from 1 to L for each sub-packet, is obtained by effecting the following steps:

h) calculating and storing the number $m_k$:

$$m_k = \frac{(k-1)m_{k-1} + m_{(k)}}{k}$$

where $m_{(k)}$ is the value of m for the sub-packet of rank k obtained by performing said steps a) to d), i) calculating $j_k$ by performing said steps e) and f) in which the number $m_k$ is substituted for the number m, j) selecting the sequence $Bj_k$ as an optimal sequence of the M bits of the sub-packet of rank k, for each value of k.

For very short bit packets typically shorter than or equal to 16 bit periods, a hardware embodiment of the invention, according to which M is equal to the number of bits of each packet, comprises in a cascade connection:

a digital frequency shift keying (FSK) signal demodulator, sampling means operating at the rate n.Fb for producing samples f representative of the characteristic frequency of the received 1 bits and 0 bits, respectively, and normalizing means for normalizing the samples f into binary values 1 or 0, is characterized in that it further includes:

(n+1) shift registers R1, R2, ..., Rn, Rn+1 of which the n first registers have a length of (M+1) bit locations to receive said n sequences B1, B2, ..., Bn of normalized samples and whose last register has a length at least equal to one bit, n Exclusive—OR gates having two inputs receiving in pairs the input samples of said (n+1) shift registers for each pair of adjacent registers, n counters each receiving the output signal of each of the n Exclusive—OR gates, a random access memory addressed by the contents of the counters, comprising n outputs D1, D2, ..., Dn and previously programmed as a specific circuit so that each addressing configuration identifying itself with said transition matrix [T] addresses a location containing the number j previously calculated according to said steps c) to f) and in a manner such that only output Dj is activated during a read command as a consequence of the specific contents of this location, extracting means for extracting, as a consequence of the activation of output Dj, at a fast rate during a guard time separating two successive packets of M bits, the bits contained in the register Rj as an optimal sequence of said M bits of each received binary pulse packet.

This arrangement implements the algorithm on which this invention is based. The number of locations of the random access memory is higher than the number of configurations really possible with the matrix [T]. For n=4 and M=16, this RAM is addressed by 16 conductors and comprises 64K memory locations of 4 or 8 bits. Each memory location contains a number equal to 1, 2, 3 or 4, identifying the maximum number j relating to the corresponding address which identifies itself with the transition matrix [T]. The stand-by time, which is longer than one bit period and which separates the packets, is sufficient to selectively clear the register of rank j carrying the best information of the n registers, at a rate, for example, equal to $32 \times n \times Fb$.

BRIEF DESCRIPTION OF THE DRAWING

The following description with regard to the annexed drawing, all given by way of example, will help to understand how the invention can be realized. In the drawings.

DETAILED DESCRIPTION OF THE PREFERRED EMBODIMENTS

Figure 1:
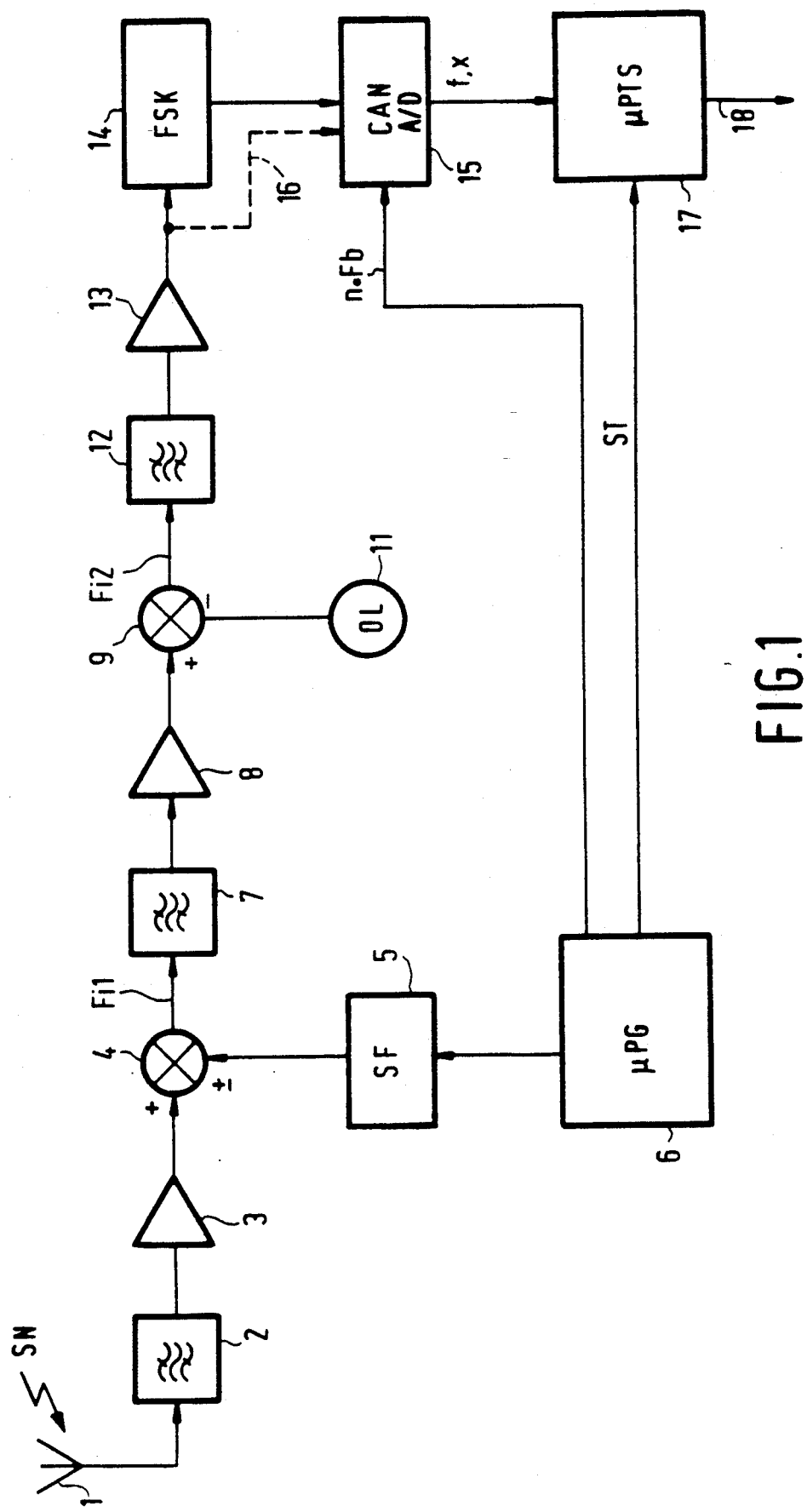
FIG. 1 is the diagram of a known superheterodyne receiver, comprising a management microprocessor and a calculation microprocessor.

The radio receiver of FIG. 1 has a double frequency transposition. It receives on an antenna 1 a digital phase shift-keyed (PSK) or frequency shift-keyed (FSK) signal SN. Preferably, the signal SN is a frequency-hopping FSK signal having a discontinuous phase; at each frequency hop an information bit packet of a short fixed length is transmitted while all the bits of the packet are useful information bearers. The length of the packet is typically less than 100 bits. Such a signal combines the most difficult conditions for recovering the bit clock. The signal received at 1 is transmitted, by means of a bandpass filter 2 and an amplifier 3, to a mixer 4 receiving on a second input a signal from a frequency synthesizer 5 (SF) itself controlled by a control microprocessor 6 μPG, for example of the 6809 or 68HC11 type from the U.S. company Motorola. Depending on the considered type of application, the mixer 4 produces at its output a frequency-additive or a frequency-subtractive signal of constant intermediate central frequency Fi1. After filtering by a bandpass filter 7 and amplifying by an amplifier 8, the signal Fi1 is subjected to a subtractive beat with the local oscillation signal from an oscillator 11 (OL) in a mixer 9 called final mixer. As a result, at the output of the mixer 9, a second signal of constant intermediate central frequency Fi2 will occur which is typically situated between several hundred Hertz and several hundred Kilohertz. The representative frequencies of the respective information bits 1 and 0 being marked F1 and F0, a signal modulation is for example considered so that, with F1 and F0 symmetrically disposed on either one side of their carrier frequency (specifically of Fi1 and Fi2), one has:

$$F1 - F0 = 0.5\ Fb$$

Fb being the bit rate.

Signal Fi2 is again filtered and amplified by a bandpass filter 12 and an amplifier 13. The amplifier 13 preferably has a very high gain and may comprise filter means (not shown) at its output in order to adapt the signal to the digital processing means situated downstream. These digital processing means are, for example, constituted by an FSK demodulator 14, followed by an analog-to-digital converter CAN 15 sampling, in a first step, the signal it receives at the rate n.Fb and producing in this case samples f which represent frequencies F1 and F0. The number n is a small even number, for example equal to 4, 6 or 8. According to a variant of the embodiment the analog output signal of the analog chain is transmitted directly to the analog-to-digital converter 15, which is represented by the broken line 16 in which case the converter 15 produces samples x. Between the current samples f, x, referenced q, there is the duality:

$$x_q = \sin[2\pi f_q q/(nF_b)] \quad (1)$$

The sampling signal at the frequency n.Fb is, for example, produced by the control microprocessor 6. The samples f or x are then supplied to a calculation microprocessor 17 μPTS. In the absence of a demodulator 14, the microprocessor 17 performs in a known manner the x-to-f transformation which is expressed by the above equation (1).

In a second step the microprocessor 17 performs an envelope demodulation and normalizes, still in a known manner, the samples f into binary samples 1 or 0, referenced f1, after these samples have been compared to an adequate threshold S representative of the mean value of the samples f.

The microprocessor 17, for example of the type TMS 320 C25 manufactured by the U.S. company of Texas Instruments, also receives the frame synchronization ST, that is to say, the packet clock from the control microprocessor 6.

A primary programming and a secondary programming, by way of a variant, of the microprocessor 17 are considered for furnishing, on an output 18 of the latter, the optimal sequences of the bits recovered in response to the received data bits, while the desired object is that the sample n nearest to the midpoint of the received bits in question is chosen to be representative of each received bit.

Figure 2:
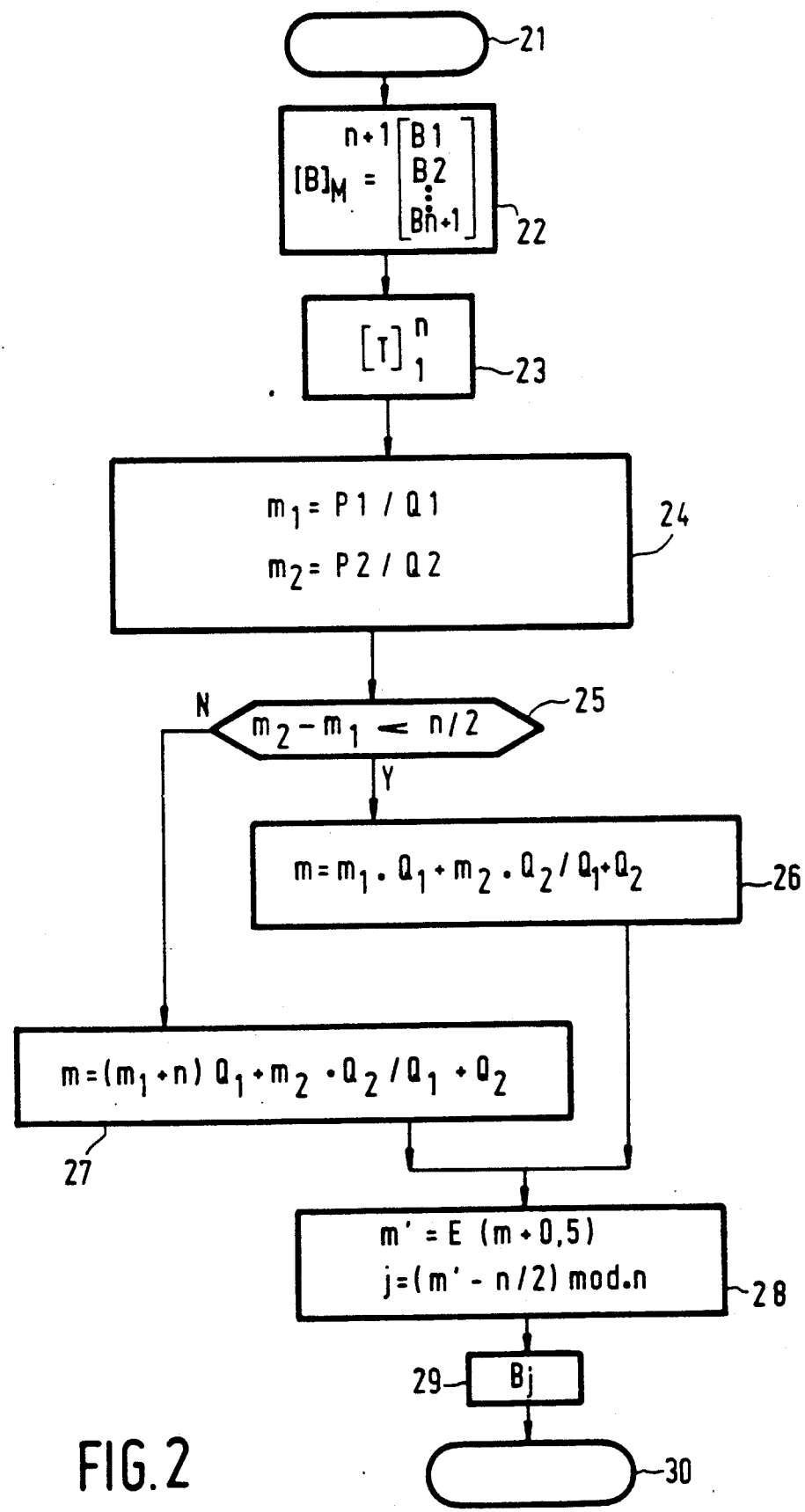
FIG. 2 is the programming flow chart of the calculation microprocessor for determining the optimal sequence Bj for M successive data bits according to the invention.

The primary programming is represented by the flowchart of FIG. 2. After the starting block 21, a sequence matrix [B] is formed in block 22, the matrix [B] having (n+1) rows (one sequence per row) and M columns, where M represents a certain number of successive bits of a packet and possibly all the bits of the packet when the latter has a short length. The sequence matrix consists of storing in a sequence memory in the following particular form:

$$[B] = \begin{bmatrix} B1 \\ B2 \\ \cdot \\ \cdot \\ \cdot \\ Bn \\ Bn+1 \end{bmatrix} = \begin{bmatrix} f1 & fn+1 & \ldots & f(M-1)n+1 \\ f2 & fn+2 & \ldots & f(M-1)n+2 \\ \cdot & \cdot & & \cdot \\ \cdot & \cdot & & \cdot \\ \cdot & \cdot & & \cdot \\ fn & f2n & \ldots & fMn \\ fn+1 & f2n+1 & \ldots & fMn+1 \end{bmatrix}$$

The read addressing of the sequence memory is devised for extracting in sequences in chronological order the elements of a single row.

From the matrix [B] is derived and stored in a transition memory, in block 23, a matrix [T] termed transition matrix having one column and n rows:

$$[T] = \begin{bmatrix} t1 \\ t2 \\ \cdot \\ \cdot \\ \cdot \\ tn \end{bmatrix} =$$

$$\begin{bmatrix} (f1 \oplus f2)+(fn+1 \oplus fn+2)+\ldots+(f(M-1)n+1 \oplus f(M-1)n+2 \\ (f2 \oplus f3)+(fn+2 \oplus fn+3)+\ldots+(f(M-1)n+2 \oplus f(M-1)n+3 \\ \cdot \\ \cdot \\ (fn \oplus fn+1)+(f2n \oplus f2n+1)+\ldots+(fMn \oplus fMn+1) \end{bmatrix}$$

the symbol $\oplus$ designating the Exclusive-OR operator. Each row element, for example t1 of the matrix T, is an integer between 0 and M, representative of the number of detected transitions of the signal received during M bit periods, these transitions being detected with an unknown shift $\tau 1$, always the same with respect to the instant marking the beginning of a received bit period. In block 24 is then performed a calculation of the barycentre relating to each half of the matrix T, that is to say, the upper barycentre m1 for the upper half of [T] and the lower barycentre m1 for the lower half of [T].

When stating:

$$P1 = \sum_{i=1}^{n/2} i \cdot ti \quad Q1 = \sum_{i=1}^{n/2} ti$$

$$P2 = \sum_{i=n/2+1}^{n} i \cdot ti \quad Q1 = \sum_{i=n/2+1}^{n} ti$$

where i is a row index varying from 1 to n, this becomes:

m1=P1/Q1 m2=P2/Q2

In block 25 the following test is subsequently made:

m2−m1<n/2.

If affirmative (Y), which means that the greater part of transitions are grouped in the centre of the matrix, worded differently, that the transition of the bits is near to rank n/2, the simple calculation of the barycentre is terminated in block 26:

(m1.Q1+m2.Q2)/(Q1+Q2).

It will be observed that the numbers m1, m2, m are generally not integers. The barycentre m is thus a pointer of the sequence nearest to the transition instant which separates one bit period from the next.

On the other hand, if m2−m1≧n/2 (N at the output of block 25), it should be considered that the transitions are separated into two parts, which indicates that transitions relating both to the beginning and end of a bit period have been detected in the matrix T. Under these conditions the calculation of the barycentre performed in block 26 is not applicable because one will obtain a number m near to the bit centre whereas, in all cases, the end of the bit period is to be indicated. Then one performs the calculation indicated in block 27:

((m1+n).Q1+m2.Q2)/(Q1+Q2).

This narrows down to the fact that, modulo-m, the matrix [T] is subjected to a rotation relating to half the rows and to the fact that a correct configuration is obtained which is eqivalent to the one corresponding with block 26.

After the block 26 or 27, a rounding-off calculation is performed in block 28 consisting of substituting for m the nearest integer:

$m' = E(m+0.5)$ the notation E(.) meaning: integer part of (.), after which one calculates the rank j of the sequence which coincides better with the bit centre:

$j=(m'-n/2)$modulo-n.

In the next block, 29, the sequence Bj is read from the sequence memory as indicated above, preferably at the rate Fb.

Block 30 marks the end of the program which is then repeated for the next M bits. The programming described above assumes the use of further memories to enable to store the current normalized samples and store them in the form of sequences, in order to be able to load one sequence memory while another sequence memory is operated, after which its selected sequence Bj is read out, all this being within the grasp of the average computer expert.

When the packet length, though remaining short, is of the order of several dozen bits, it is advantageous, while retaining the software solution described above, to assign a very low value to M, for example, M=4, and proceed iteratively. This variant (not shown) consists of performing the following operations for recovering a packet (a frame) of received bits.

The 4 first bits are processed as described above with reference to FIG. 2 and the corresponding number m, designated $m_{(1)}$, is stored. For the second slice of 4 bits the operations of the blocks 21 to 27 are performed producing the number $m_{(2)}$. The number m, denoted $m_2$, retained for the second slice of 4 bits, is again obtained by means of a calculation of the barycentre:

$$m_2 = \frac{m_{(1)} + m_{(2)}}{2}$$

The number $m_2$ is stored after which the operations of the blocks 28 and 29 are performed with respect to $m_2$.

For each next slice of 4 bits, the operations described with respect to the second slice are repeated. For the slice of the order of k, one obtains:

$$m_k = \frac{(k-1)m_{k-1}+m_{(k)}}{k}$$

$m_{(k)}$ being the value of m for the sub-packet of rank k obtained by performing the operations of the blocks 21 to 27 of FIG. 2.

The operation is repeated up to the last slice L of each packet.

When proceeding in this manner, a value of j will be obtained which will become greater from the beginning to the end of the packet.

According to this variant, when packets of 100 bits divided into 25 slices of 4 bits (M=4, L=25, n=6) are concerned, the results summed up in the following table will be obtained:

TABLE

| | | With noise: Bit energy/noise power density (in dB) | | | | | |
|---|---|---|---|---|---|---|---|
| Without noise | | 10.3 dB | | 7.8 dB | | 5.0 dB | |
| k | $m_k$ | k | $m_k$ | k | $m_k$ | k | $m_k$ |
| 1 | 6.50 | 1 | 5.50 | 1 | 5.25 | 1 | 6 |
| . | | . | | . | | . | |
| . | | . | | . | | . | |
| . | | . | | . | | . | |
| 10 | 6.11 | 10 | 5.76 | 10 | 6.24 | 10 | 6.45 |
| . | | . | | . | | . | |
| . | | . | | . | | . | |
| 20 | 6.01 | 20 | 5.88 | 20 | 6.17 | 20 | 6.72 |
| . | | . | | . | | . | |
| . | | . | | . | | . | |
| 25 | 6 | 25 | 5.98 | 25 | 6.26 | 25 | 6.66 |
| | j = 3 | | j = 3 | | j = 3 | | j = 4 |

| j | Error probability in number of bits, for 1000 (10 packets) transmitted bits | | | |
|---|---|---|---|---|
| 1 | 0 | 39 | 90 | 122 |
| 2 | 0 | 5 | 16 | 85 |
| 3 | ->0 | ->0 | ->14 | ->75 |
| 4 | 0 | 2 | 24 | 82 |
| 5 | 0 | 36 | 72 | 160 |
| 6 | 243 | 252 | 259 | 303 |

The arrows at the bottom of the table indicate the selected value j of each column.

Figure 3:
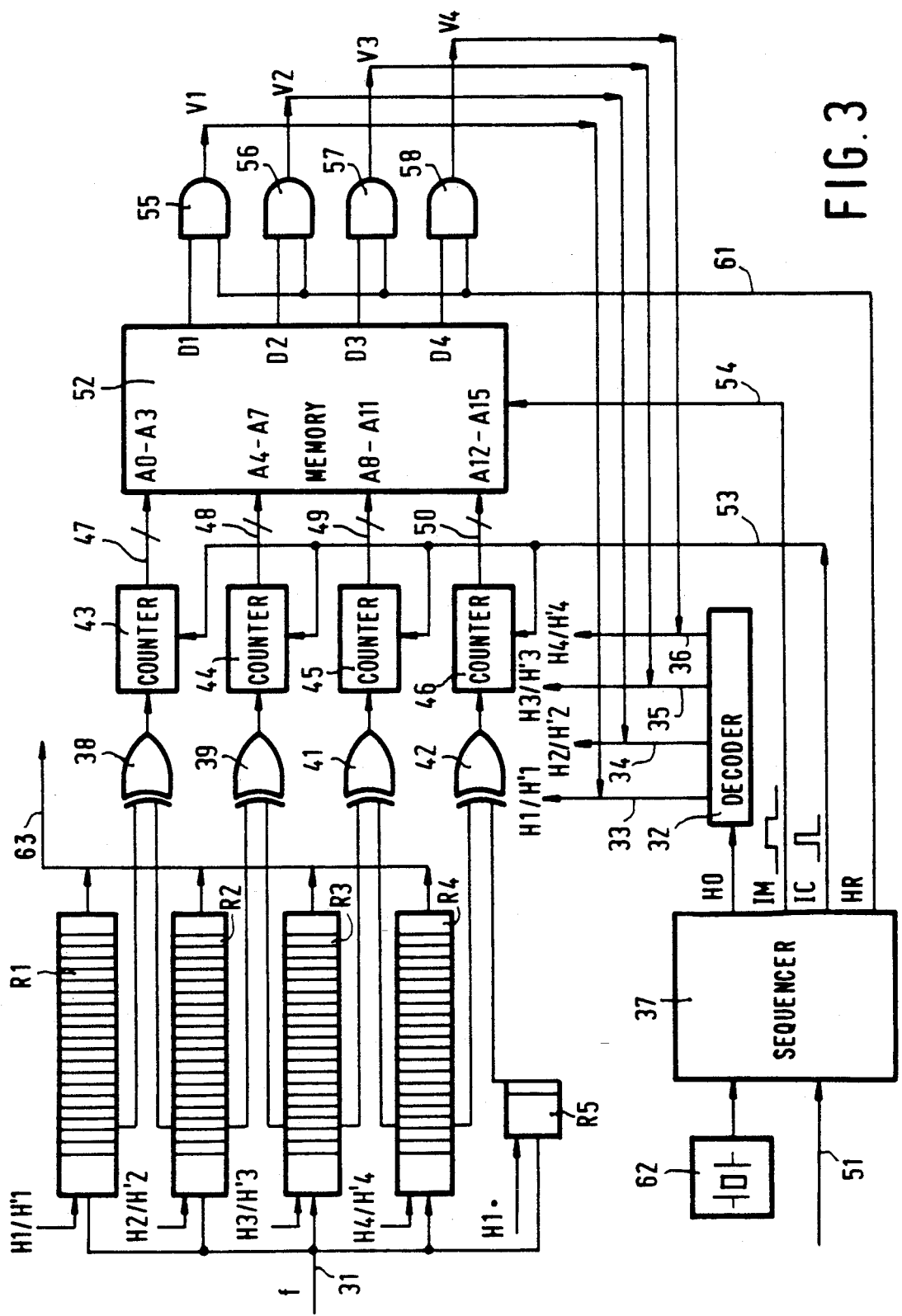
FIG. 3 is the block diagram of an FSK signal bit synchronization arrangement according to the invention.

The arrangement of FIG. 3 is an embodiment of the invention effecting bit synchronization on the basis of logic operators, shift registers and a read-only-memory. All these functions can be integrated in a single specific circuit. This will then enable the operating speed to be augmented and the consumption and cumbersomeness of the arrangement to be reduced significantly. The arrangement of FIG. 3 is preferably applied to packets of very short lengths, typically shorter than 32 bits, for example 16 bits. In this case the algorithm of FIG. 2 is applied with: M=16. In the considered application one has also chosen: n=4.

The circuit of FIG. 3 receives, at an input 31, standardized (normalized) samples f having the values 0 or 1 after processing in a FSK demodulator. The input 31 is connected to a set of 5 shift registers R1, R2, R3, R4, R5, of which the 4 first registers have a length of 17 locations and the last register a length at least equal to 1. The samples f are demultiplexed using 4 clocks H1, H2, H3 and H4. These clocks are generated by a ¼ decoder 32 on the respective output conductors 33, 34, 35, 36, in response to the sampling signal at the frequency: HO=n.Fb, itself generated by a sequencer 37. The clocks H1 to H4 are shifted in time by one sample period: 1/HO and their frequency is equal to Fb. It should be observed that the same clock H1 is supplied both to R1 and R5. The registers R1 to R4 constitute, when full, the row sequences B1 to Bn (B4) of the matrix [B]. The sequence B5, dynamically corresponding with the row (n+1) of [B], is a replica of B1, shifted by one bit period, that is to say: 4/HO. The detection of the transitions between two consecutive sequences is made, in pairs of elements, by Exclusive-OR gates 38, 39, 41, 42 respectively, whose two inputs are connected to two parallel outputs of the shift registers having the same rank (outputs of the second location, for example), except for the register R5 (output of the first location). The output of each gate 38 to 42 is connected to a respective counter 43, 44, 45, 46 which is incremented by one for each detected transition. The number of output bits of the counters 43 to 46 is determined by the number of transitions possible over a message of 60 bits. At the end of each packet of 16 bits the counters 43 to 46 identify themselves with the transition matrix [T] and on a multiple output, in this case having 4 conductors 47, 48, 49 and 50, they produce an addressing configuration for a read-only memory 52. It will be observed that the maximum number of output bits of each counter, determining the number of output conductors, is determined by the maximum number of possible transitions over a message of 16 bits and, more generally, of M bits. Each location of the memory 52 permanently contains a sequence number to be selected from the contents of the registers R1 to R4. Before being written into a memory, this number (j) is itself determined by applying an algorithm, defined by the flowchart of FIG. 2, to the addressing configuration of the considered memory location. This writing into the memory is effected for all possible address configurations which in the example requires the use of a memory having $2^{16}$ (64K) locations and, more generally, $2^M$ locations. For example, a ROM having 64K bytes is selected. The optimal sequence number (rank) j thus selected is then used for extracting the bits from the register having the same rank, which is within the grasp of the average computer expert. A preferred solution is described for extracting bits from one of the registers R1 to R4: the sequencer 37, receiving on an input 51 the frame synchronization, for example, from the control microprocessor 6 of FIG. 1, transmits to the counters just after the end of the packet (frame), over a conductor 53, a short-duration pulse IC which causes the transmission of their bit-coded contents through their addressing outputs 47 to 50 and causes them to be reset to zero. A short-duration IM pulse, of the order of one bit period, is then transmitted over a conductor 54 of the sequencer 37 to a validation input of the output of memory 52. During the whole pulse period IM, the contents j of the memory location selected by the addressing over the conductors 47 to 50 is read in the following manner: memory 52 comprises n outputs D1 to Dn and among these outputs only the output Dj is activated, that is to say, set to 1, whereas the other outputs remain inactive, that is to say, retain the state 0. Each of these outputs is connected to an AND gate 55, 56, 57, 58 in FIG. 3, receiving through a second input a fast clock signal HR from the sequencer 37 which produces, on a conductor 61, M clock beats for the duration of the pulse IM. During this period IM one of the outputs V1, V2, V3, V4 of the AND-gates 55 to 58, the output Vj and only this output, produces a fast clock signal H'j which is transmitted to the corresponding register Rj, whereas the outputs V1, ..., Vn other than Vj and connected to the corresponding clock inputs of the registers R1, ..., Rn retain the state 0. The 16 (M) last locations of the shift register Rj are then read out in the chronological order in which they arrive over a common serial output conductor 63, at the fast clock rate HR whose frequency is, for example, equal to that of the reference clock generator 62: Href=32 (n.Fb). The clock change over the conductors 33 to 36 is effected, for example, by bringing the decoder 32 into the high-impedance state for the duration of a pulse IM or also by the fact that these conductors are connected to the collectors of open transistors for this duration, while the clock HO is not transmitted between two successive frames. The period of time passing between the beginning of the pulse IC and the end of the pulse IM is contained in the guard time (longer than one bit period) that separates two successive packets.

I claim:

1. A bit synchronization method, in a receiver, for data packets or sub-packets having a predetermined short length, formed as binary pulses representing bits of digital information and being received in an asynchronous manner relative to a bit clock, at a bit rate Fb, and presenting detectable transitions between binary states, comprising a first step of sampling said packets or sub-packets at the rate n.Fb, where n is a small even integer, a second step which consists of normalizing the samples thus obtained, or samples derived from the latter, into binary values 1 or 0, by comparing each sample to a predetermined threshold S to form a bit train of normalized samples f, characterized in that the method further includes the following steps:

a) storing $M \cdot (n+1)$ normalized samples according to a sequence matrix [B] having (n+1) rows and M columns, where M is a number of successive bits of said packets or sub-packets which have been sampled:

$$[B] = \begin{bmatrix} B1 \\ B2 \\ \cdot \\ \cdot \\ \cdot \\ Bn+1 \end{bmatrix} = \begin{bmatrix} f1 & fn+1 & f2n+1 & \ldots & f(M-1)n+1 \\ f2 & fn+2 & f2n+2 & \ldots & f(M-1)n+2 \\ \cdot & & & & \cdot \\ \cdot & & & & \cdot \\ \cdot & & & & \cdot \\ fn+1 & f2n+1 & f3n+1 & & f(M \cdot n)+1 \end{bmatrix}$$

b) determining and storing a transition column matrix [T] having n rows:

$$[T] = \begin{bmatrix} t1 \\ t2 \\ \cdot \\ \cdot \\ \cdot \\ tn \end{bmatrix} =$$

$$\begin{bmatrix} (f1 \oplus f2)+(fn+1 \oplus fn+2)+\ldots+(f(M-1)n+1 \oplus f(M-1)n+2) \\ (f2 \oplus f3)+(fn+2 \oplus fn+3)+\ldots+(f(M-1)n+2 \oplus f(M-1)n+3) \\ \cdot \\ \cdot \\ (fn \oplus fn+1)+(f2n \oplus f2n+1)+\ldots+(fMn \oplus fmn+1) \end{bmatrix}$$

where $\oplus$ designates the Exclusive-OR operator c) calculating two barycentre numbers m1, m2, derived from the matrix

[T]:
$m1 = P1/Q1$
$m2 = P2/Q2$ where
$$P1 = \sum_{i=1}^{n/2} i \cdot ti \quad Q1 = \sum_{i=1}^{n/2} ti$$

$$P2 = \sum_{i=n/2+1}^{n} i \cdot ti \quad Q2 = \sum_{i=n/2+1}^{n} ti$$

and i varies from 1 to n, d) calculating a number m derived from the numbers m1, m2 and from the matrix [T]:

$m = (m1 \cdot Q1 + m2 \cdot Q2)/(Q1 + Q2)$    if: $m2-m1 < n/2$ $m = ((m1+n) \cdot Q1 + m2 \cdot Q2)/(Q1 + Q2)$    if: $m2-m1 \geq n/2$ e) calculating an integer m' derived from the number m:

$m' = E(m+0.5)$ f) calculating an integer j comprised between 1 and n, derived from the numbers m' and n:

$j = (m' - n/2)$ modulo $-n$ g) choosing the sequence Bj as au optimal sequence of said M bits of each packet or sub-packet, respectively, of received binary pulses.

2. Bit synchronization method as claimed in claim 1, characterized in that the number M is a sub-multiple of the number of bits constituting the length of a packet of binary pulses, the latter being constituted by L successive sub-packets having length M, and in that the sequence $Bj_k$ related to the sub-packet of rank k, where k varies chronologically from 1 to L for each sub-packet, is obtained iteratively by performing the following steps:

h) calculating and storing the number $m_k$:

$$m_k = \frac{(k-1)m_{k-1} + m_{(k)}}{k}$$

where $m_{(k)}$ is the value of m for the sub-packet of rank k obtained by performing said steps a) to d), i) calculating $j_k$ by performing said stages e) and f) in which the number $m_k$ is substituted for the number m, j) selecting the sequence $Bj_k$ as an optimal sequence of the M bits of the sub-packet of rank k, for each value of k.

3. Bit synchronization method as claimed in claim 1, in a homodyne or heterodyne receiver receiving, during digital frequency shift keyed transmission (FSK), packets (or frames) of binary pulses of a fixed predetermined short length at a rate Fb, according to which the intermediate frequency signal Fi obtained at the output of the final mixer is sampled, in the first step, at the rate n.Fb in order to produce samples x, after which said samples x(f) are converted into their instantaneous inverse function f(x) representative of the characteristic frequency of the received 1 or 0 bits respectively, after which said samples f(x) are sorted into binary values 1 or 0.

4. Bit synchronization method as claimed in claim 2, in a homodyne or heterodyne receiver receiving, during digital frequency shift keyed transmission (FSK), packets (or frames) of binary pulses of a fixed predetermined short length at a rate Fb, according to which the intermediate frequency signal Fi obtained at the output of the final mixer is sampled, in the first step, at the rate n.Fb in order to produce samples x, after which said samples x(f) are converted into characteristic frequency of the received 1 or 0 bits respectively, after which said samples f(x) are sorted into binary values 1 or 0.

5. Bit synchronization apparatus, in a receiver, for packets or sub-packets of binary pulses having a predetermined short length carrying digital information and being received in an asynchronous manner relative to a bit clock, at a rate Fb, and presenting detectable transitions between binary states, comprising means for sampling said packets or sub-packets at the rate n.Fb, where n is a small even integer, and for normalizing the samples thus obtained, or samples derived from the latter, into binary values 1 or 0, by comparing each sample to a predetermined threshold S to form a bit train of normalized samples f, characterized in that the apparatus further includes arithmetic means for:

a) storing over M successive bits belonging to each bit train of M.(n+1) normalized samples according to a sequence matrix [B] with (n+1) rows and M columns:

$$[B] = \begin{bmatrix} B1 \\ B2 \\ \cdot \\ \cdot \\ \cdot \\ Bn+1 \end{bmatrix} = \begin{bmatrix} f1 & fn+1 & f2n+1 & \ldots & f(M-1)n+1 \\ f2 & fn+2 & f2n+2 & \ldots & f(M-1)n+2 \\ \cdot & \cdot & \cdot & & \cdot \\ \cdot & \cdot & \cdot & & \cdot \\ fn+1 & f2n+1 & f3n+1 & & f(M\cdot n)+1 \end{bmatrix}$$

b) determining and storing a transition column matrix [T] having n rows:

$$[T] = \begin{bmatrix} t1 \\ t2 \\ \cdot \\ \cdot \\ tn \end{bmatrix} = $$

$$\begin{bmatrix} (f1 \oplus f2)+(fn+1 \oplus fn+2)+\ldots+(f(M-1)n+1 \oplus f(M-1)n+2) \\ (f2 \oplus f3)+(fn+2 \oplus fn+3)+\ldots+(f(M-1)n+2 \oplus f(M-1)n+3) \\ \cdot \\ \cdot \\ (fn \oplus fn+1)+(f2n \oplus f2n+1)+\ldots+(fMn \oplus fMn+1) \end{bmatrix}$$

where + designates the Exclusive-OR operator c) calculating two barycentre number m1, m2, derived from the matrix

[T]:

$m1 = P1/Q1$ $m2 = P2/Q2$ where $$P1 = \sum_{i=1}^{n/2} i \cdot ti \quad Q1 = \sum_{i=1}^{n/2} ti$$

$$P2 = \sum_{i=n/2+1}^{n} i \cdot ti \quad Q2 = \sum_{i=n/2+1}^{n} ti$$

and i varies from 1 to n, d) calculating a number m derived from the numbers m1, m2 and from the matrix [T]:

-continued $m = m1\, Q1 + m2\, Q2/Q1 + Q2$    if: $m2-m1 < n/2$ $m = (m1+n)\, Q1 + m2\, Q2/Q1 + Q2$    if: $m2-m1 \geq n/2$ e) calculating an integer m' derived from the number m:

$m' = E(m+0.5)$ f) calculating an integer j comprised between 1 and n, derived from the numbers m' and n:

$j = (m'-n/2) \text{ modulo } -n$ g) choosing the sequence Bj as an optimal sequence of said M bits of each packet or sub-packet, respectively, of received binary pulses.

6. Bit synchronization apparatus as claimed in claim 5, where M is equal to the number of bits of each received packet of binary pulses, said apparatus being characterized in that it comprises a control microprocessor and a calculation microprocessor, in that the control microprocessor is programmed to supply to the calculation microprocessor, a frame synchronization signal and in that said calculation microprocessor is programmed to comprise the means for performing the conversion of samples into binary values 1 or 0, and for performing the steps a) to g) and to produce on an output at the rate Fb the optimal sequence of said M bits of each packet of binary pulses.

7. Bit synchronization apparatus as claimed in claim 5, where M is equal to the number of bits of each of L sub-packets, said apparatus comprising an analog-to-digital converter for producing said samples x at the rate n.Fb, the apparatus being characterized in that it comprises a control microprocessor and a calculation processor, in that the control microprocessor is programmed to supply to the calculation microprocessor a frame-synchronization signal, and in that calculation microprocessor is programmed to comprise means for performing normalizing the samples into binary values 1 or 0, to perform for each sub-packet said steps a) to d), h) to j) and to produce on an output the optimal, at the rate Fb, sequence of said M bits of each sub-packet of binary pulses.

8. Bit synchronization apparatus as claimed in claim 5, where M is equal to the number of bits of each received packet of binary pulses, said apparatus comprising in a cascade connection:

a digital frequency shift keying (FSK) signal demodulator, said sampling means, and said normalizing means, and wherein said arithmetic means comprises:

(n+1) shift registers R1, R2, ..., Rn, Rn+1 of which the n first registers have a length of (M+1) bit locations to receive said n sequences B1, B2, ..., Bn of normalized samples and whose last register has a length at least equal to one bit, n Exclusive-OR gates having two inputs receiving in pairs the input samples of said (n+1) shift registers for each pair of adjacent registers, n counters each receiving the output signal of each of n Exclusive-OR gates, a random access memory addressed by the contents of the counters, comprising n outputs D1, D2, ..., Dn and previously programmed as a specific circuit so that each addressing configuration identifying itself with said transition matrix addresses a location containing the number j previously calculated according to said steps c) to f) and in a manner such that only output Dj is activated during a read command as a consequence of the specific contents of this location, extracting means for extracting, as a consequence of the activation of output Dj, at a fast rate during a guard time separating two successive packets of M bits, the bits contained in the register Rj as an optimal sequence of said M bits of each received bit pulse packet.

9. Bit synchronization apparatus as claimed in claim 5, characterized in that the number M is a sub-multiple of the number of bits constituting the length of a packet of binary pulses, the latter being constituted by L successive sub-packets having length M, and in that the arithmetic means further comprises means for alternatively obtaining a sequence $Bj_k$ related to the sub-packet of rank k, where k varies chronologically from 1 to L for each sub-packet by:

h) calculating and storing the number $m_k$:

$$m_k = \frac{(k-1)m_{k-1}\, m_{(K)}}{k}$$

where $m_{(k)}$ is the value of m for the sub-packet of rank k obtained by performing said steps a) to d), i) calculating $j_k$ by performing said steps e) and f) in which the number $m_k$ is substituted for the number m.

j) selecting the sequence $Bj_k$ as an optimal sequence of the M bits of the sub-packet of rank k, for each value of k.

10. A method of bit synchronization in a data receiver, said data being received as a packet or sub-packet of binary pulses defining bits at a bit rate Fb, said pulses being asynchronous relative to a bit clock and having detectable transitions between binary states, comprising:

a) sampling said packet or sub-packet at a rate n.Fb, where n>1, to obtain samples, b) comparing each sample to a predetermined threshold to form a bit train of normalized samples having binary values, c) comparing each of a sequence of normalized samples in said bit train with the succeeding normalized sample to determine bit train transitions, d) determining and storing a transition column matrix having n rows, wherein each row has a value ti=t-(i)+t(i+n) ... t(i+(M−1)n); i has integer values from 1 to n; t(i)=1 if there is a transition between a normalized sample and its successor; and t(i)=0 where there is no transition between a normalized sample and its successor, e) evaluating said transition column matrix to determine whether elements comprising the most transitions appear near the middle of the transition column matrix or near an end thereof; and responsive to said most transitions appearing near the middle, calculating the center of gravity of said transition column matrix, f) responsive to said elements comprising the most transitions appearing near an end thereof, deriving a further transition column matrix by rotation of the rows by half a cycle, and calculating the center of gravity of said further transition column matrix, g) determining, from the center of gravity calculated in step e) or f), the row of said transition column matrix which is most closely synchronized to said binary pulses of said packet or sub-packet.

11. A method as claimed in claim 10, comprising the additional step of storing a first string of M.(n+1) normalized samples according to a sequence matrix having (n+1) rows and M columns, where M is a number of successive bits of said packets or sub-packets of binary pulses, choosing the row of said sequence matrix which is half a data pulse removed from said row of the transition column matrix determined in step g), and using the normalized samples of the chosen row as the bits comprising said packet or sub-packet.

12. A method of bit synchronization in a data receiver, said data being received as a packet or sub-packet of binary pulses defining bits at a bit rate Fb, said pulses being asynchronous relative to a bit clock and having detectable transitions between binary states, comprising:

a) sampling said packet or sub-packet at a rate n.Fb, where n is an even integer, to obtain samples, b) comparing each sample to a predetermined threshold to form a bit train of normalized samples having binary values, c) comparing each of a sequence of normalized samples in said bit train with the succeeding normalized sample to determine bit train transitions, d) determining and storing a transition column matrix having n rows, wherein each row has a value ti=t-(i)+t(i+n) ... t(i+(M−1)n); i has integer values from 1 to n; t(i)=1 if there is a transition between a normalized sample and its successor; and t(i)=0 where there is no transition between a normalized sample and its successor, e) evaluating said transition column matrix to determine whether elements comprising the most transitions appear near the middle of the transition column matrix or near an end thereof; and responsive to said most transitions appearing near the middle, calculating the center of gravity of said transition column matrix, f) responsive to said elements comprising the most transitions appearing near an end thereof, deriving a further transition column matrix by rotation of the rows by half a cycle, and calculating the center of gravity of said further transition column matrix, g) determining, from the center of gravity calculated in step e) or f), the row of said transition column matrix which is most closely synchronized to said binary pulses of said packet or sub-packet.

13. A method as claimed in claim 12, comprising the additional step of storing a first string of M. (n+1) normalized samples according to a sequence matrix having (n+1) rows and M columns, where M is a number of successive bits of said packets or sub-packets of binary pulses, choosing the row of said sequence matrix which is n/2 removed from said row of the transition column matrix determined in step g), and using the normalized samples of the chosen row as the bits comprising said packet or sub-packet.

* * * * *